United States Patent [19]
Miller

[11] Patent Number: 6,079,102
[45] Date of Patent: Jun. 27, 2000

[54] JOURNAL BEARING METHOD EMPLOYING SELF-STABILIZING, TRUE-TILTING PAD WITH ABRUPTLY-STEPPED POCKET

[75] Inventor: William Miller, Albany, N.Y.

[73] Assignee: WHM Holdings Corporation, Cohoes, N.Y.

[21] Appl. No.: 09/040,621

[22] Filed: Mar. 18, 1998

Related U.S. Application Data

[62] Division of application No. 08/828,979, May 31, 1997, Pat. No. 5,772,335.

[51] Int. Cl.[7] .................................................. B23P 15/00
[52] U.S. Cl. ...................... 29/898.07; 384/117; 384/309
[58] Field of Search ................................ 29/898, 898.07, 29/898.09; 384/117, 309, 122, 306, 307, 308, 310, 311, 312

[56] References Cited

U.S. PATENT DOCUMENTS

| | | | |
|---|---|---|---|
| 2,731,305 | 1/1956 | Wilcock | 384/307 |
| 3,687,506 | 8/1972 | Dee | 308/9 |
| 3,807,814 | 4/1974 | Stopp | 384/312 |
| 4,059,318 | 11/1977 | Hollingworth | 308/73 |
| 4,597,676 | 7/1986 | Vohr | 384/114 |
| 4,919,549 | 4/1990 | Lawson et al. | 384/113 |
| 5,030,015 | 7/1991 | Baker et al. | 384/117 |
| 5,288,153 | 2/1994 | Gardner | 384/311 |
| 5,372,431 | 12/1994 | Ide | 384/122 |
| 5,547,287 | 8/1996 | Zeidan | 384/117 |

FOREIGN PATENT DOCUMENTS 0 170 572  3/1985  European Pat. Off. .

*Primary Examiner*—David P. Bryant
*Assistant Examiner*—Marc W. Butler
*Attorney, Agent, or Firm*—Heslin & Rothenberg, P.C.

[57] ABSTRACT

True-tilting pad of journal bearing has face with border region including engagement surface and defining pocket with longitudinal sidebars, bottom, and abrupt step. The pad has leading and trailing portions, with the face extending longitudinally therebetween. The portions can be positioned upstream and downstream, respectively, relative to rotation direction of rotatable shaft having convex surface. The pad is pivotally supported by pivot and can cooperate with one or more other pads and fluid within housing to hydrodynamically and mechanically support the shaft. The pad tilts free of mechanical engagement with other pads. The leading portion can define an entrance to the pocket and the sidebars can converge along the rotation direction. The pocket hydrodynamically increases pressure on the convex surface of the shaft during rotation, and generates pressure effecting on the face counteraction force about the pivot and upstream relative to the rotation direction in order to counteract spragging force.

10 Claims, 5 Drawing Sheets

JOURNAL BEARING METHOD EMPLOYING SELF-STABILIZING, TRUE-TILTING PAD WITH ABRUPTLY-STEPPED POCKET

This application is a divisional of application Ser. No. 08/828,979, filed Mar. 31, 1997, now U.S. Pat. No. 5,772,335.

TECHNICAL FIELD

This invention relates, in general, to tilting pads and, in particular, to tilting pads of a journal bearing for supporting a convex surface of a rotatable shaft in a housing holding fluid.

BACKGROUND ART

Hydrodynamic pads cooperate amongst themselves and with oil, or other liquid or gaseous fluid, in the same housing to form an overall bearing for a journal or shaft to be rotated within the housing. The shaft commonly rotates with its axis oriented either vertically or horizontally. Each hydrodynamic pad typically defines a concave arc on its inner face. Further, this arc faces the convex surface of the shaft. Also, a mechanical pivot on the housing often supports the pad.

Instead of the mechanical pivot, one can support the pad using a hydrostatic pivot. An example of such a hydrostatic pivot can be configured in accordance with the disclosure of U.S. Pat. No. 4,059,318 to Hollingsworth, Nov. 22, 1977, which is hereby incorporated herein by reference in its entirety.

A conventional tilting pad is an example of a tilting type of hydrodynamic pad. Furthermore, conventional tilting pads are widely acknowledged to be the most stable type of hydrodynamic pad. An example of an overall bearing configuration for a shaft having horizontal axis orientation could include two lower, tilting pads and one upper, stationary pad, in accordance with the disclosure of U.S. Pat. No. 4,597,676 to Vohr et al., Jul. 01, 1986, which is hereby incorporated herein by reference in its entirety.

Hydrodynamic pads work through a wedge effect in the fluid between the pads and the convex surface of the shaft. Such fluid is often descriptively called the squeeze film. This fluid wedge yields a hydrodynamic lift acting on the convex surface of the shaft and directed away from the arc of the pad. One can recognize occurrences of this wedge effect in common events such as a person water-skiing or an automobile tire hydroplaning.

Introducing preload is a usual method for enhancing the fluid wedge effect. For example, one can assemble the pads to form a circular bearing having a first radius larger than the radius of a particular shaft to be supported. Then, one can remove material from the leading and trailing portions, or edges, of the pads so they physically can be assembled more closely around the convex surface of the shaft. Nevertheless, the arc of each individual pad still corresponds to the first radius. This allows for the preload, as discussed below.

Considering an instance when the shaft is positioned close to an individual pad and symmetrically with respect to the arc of that pad, one can understand that the convex surface of the shaft is physically closer to the arc of the pad at the center of the arc than at either end of the arc. Analysis of the region from the leading edge to the center of the arc reveals this arrangement gives rise to a converging hydrodynamic fluid wedge between the convex surface and the arc.

Introducing offset of the pivot with respect to the center of the arc length of the pad is another means of enhancing the fluid wedge effect. Typically, the pivot can be offset longitudinally downstream between about fifty to sixty percent of the arc length. One can employ offset to increase the fluid wedge effect through modification of the relationship of moments between the leading and trailing lever arms of the pad. Preload, discussed above, can be combined with offset to further increase the fluid wedge effect.

Tilting by the conventional tilting pad further enhances the wedge effect. Namely, the conventional tilting pad desirably accentuates the converging wedge by permitting the leading edge of the pad to pivot away from the convex surface of the shaft.

The overall bearing, formed by the circular arrangement of the pads, has an overall radius. As discussed above with respect to preload, the arc of each pad could correspond to a first radius different from the theoretical overall bearing radius into which the pads are assembled. Eccentricity measures the deviation from an ideal condition in which the axis of the shaft is collinear with the axis of the overall bearing. In this ideal condition, one can say the shaft is centered and experiences zero load. Furthermore, in this ideal condition, the shaft has maximum clearance with respect to the overall bearing.

As one deviates from this ideal condition, into many possible non-ideal conditions, by loading the shaft, eccentricity increases. Moreover, the clearance of the shaft with respect to a particular pad of the bearing decreases. During operation at large loads, the shaft assumes maximal operating eccentricity, assuming a non-failure/non-contact condition. At contact during operation, the eccentricity equals one, so the shaft has zero clearance over the particular pad. This operational failure condition allows the shaft to undergo forced mechanical engaging between its convex surface and the face of the particular pad. Of course, at start-up and shut-down, that is, before and after operational rotation of the shaft, mechanical contact occurs without operational failure.

Hydrodynamic pads are prevalent in turbo-machinery such as pumps, compressors, and turbines. For instance, consider the case of a turbine blade on its shaft. Here, turbine efficiency is determined, in part, by how little clearance one must design for the tip of the rotating blade to pass over the stationary housing. This clearance represents a loss because it provides a fluid leakage path. Namely, fluid passing through the leakage path makes no positive contribution because it escapes work. This loss is characteristic of all turbo-machinery having some type of rotating impeller. The performance or effectiveness of the rotational operation of the turbo-machinery is strongly inversely proportional to the amount of clearance the designer must provide for operation of the impeller or blades mounted on the shaft. So, one desires to minimize the required operating clearance.

During rotation, the shaft tends to orbit elliptically, as is well-known in the art. This elliptical orbit further contributes to the amount of clearance a designer must provide for the operation of the shaft during its rotation. Accordingly, one desires to minimize both the eccentricity of the shaft position and also the ellipticity of its orbit, during rotation.

For dynamic considerations, a convenient representation of bearing characteristics is by spring and damping coefficients. For a horizontal shaft axis orientation, these are obtained as follows.

First, the equilibrium position to support the given load is established by computer solution of the well-known Reynolds equation. Here, horizontal and vertical directions are represented by respective X and Y directions. Second, a small displacement is applied to the shaft in the X direction. A new solution of Reynolds equation is obtained and the resulting forces in the X and Y directions are produced. The spring coefficients are as follows:

where $\Delta F_x$=difference between X forces in the displaced and equilibrium $$K_{xy} = \frac{\Delta F_x}{\Delta y}$$

$$K_{yy} = \frac{\Delta F_y}{\Delta y}$$

positions where $\Delta F_y$=difference between Y forces in the displaced and equilibrium positions where $\Delta y$=displacement from equilibrium position in Y direction $K_{xy}$=stiffness in X direction due to Y displacement $K_{yy}$=stiffness in Y direction due to Y displacement Third, the shaft is returned to its equilibrium position and a Y displacement applied. Next, similar reasoning produces $K_{xx}$ and $K_{yx}$. The damping coefficients $D_{ij}$ are produced in a like manner. Namely, velocities, rather than displacements, in the X and Y directions are consecutively applied with the shaft in the equilibrium position. So, for most fixed bearing configurations, there are a total of eight coefficients: four spring (or stiffness) and four damping.

The total force on the shaft is:

$$F_i = K_{ij}X_j + D_{ij}\dot{X}_j$$

$F_i$=force in the $i^{th}$ direction, where repeated subscripts imply summation, for example:

The spring and damping coefficients represent a $$K_{ij}X_j = K_{ix}X + K_{iy}Y$$

linearization of bearing characteristics. Here, one should determine the equilibrium position accurately because the coefficients are valid only about a small displacement region.

The magnitude of the off-diagonal terms of the spring and damping coefficients matrices reflects the degree of cross-coupling in the bearing configuration. One should note that the matrix of the spring coefficients is commonly referred to as the stiffness matrix. For example, consider the following common geometrical and operating conditions of a single-piece, two axial groove bearing for a horizontal shaft.

Shaft Diameter, D=5 in.
Bearing Length, L=5 in.
Active Pad Angle, $\theta_p$=160° (10° grooves on either side of pad)
Radial Clearance, c=0.0025 in.
Operating Speed, N=5000 rpm
Lubricant Viscosity, $\mu$=2×10$^{-6}$ lb-sec/in.$^2$
Eccentricity Ratio, $\epsilon$=0.5
Load Direction=Vertical Down For these conditions, a computer solution yields the following results:

Bearing Load, w=20,780 lbs.
Horsepower Loss, hp=15.51
Minimum Film Thickness, $h_M$=0.00125 in.
Side Leakage, $q_s$=0.941 gpm Spring and Damping Coefficients: (The signs, positive or negative, of the coefficients conform to the rotor dynamic codes utilized.)

Spring Coefficients: (lbs/in.)

$$\begin{bmatrix} K_{xx} & K_{xy} \\ K_{yx} & K_{yy} \end{bmatrix} = \begin{bmatrix} 12.14 \times 10^6 & 4.64 \times 10^6 \\ -28.3 \times 10^6 & 20.41 \times 10^6 \end{bmatrix}$$

Damping Coefficients: (lbs-sec./in.)

$$\begin{bmatrix} D_{xx} & D_{xy} \\ D_{yx} & D_{yy} \end{bmatrix} = \begin{bmatrix} 2.85 \times 10^4 & -2.66 \times 10^4 \\ 2.69 \times 10^4 & 1.11 \times 10^5 \end{bmatrix}$$

The magnitude of the off-diagonal terms ($K_{xy}$, $K_{yx}$, $D_{xy}$, $D_{yx}$) evidences the above bearing configuration has very strong cross-coupling. That is, the terms off the diagonal of terms ($K_{xx}$, $K_{yy}$, $D_{xx}$, $D_{yy}$) extending from the upper left to the lower right positions in the matrices have large magnitudes.

In one known configuration, conventional tilting pads are interleaved. There, each single pad cannot independently find its own equilibrium position. Rather, in addition to fluid pressure forces, each pad must respond to two other forces on its leading and trailing edges owing to mechanical contact with adjacent pads. In particular, the pad experiences reaction forces on its ends from touching preceding and consecutive pads. So, the pads do not tilt independently. What a first pad does influences a second pad, and so on. As introduced above, such interdependencies appear mathematically as sizable off-diagonal terms in the stiffness and damping matrices. Furthermore, sizable cross-coupling terms give rise to destabilizing forces in the bearing, undesirably producing the well-known phenomenon of half-speed whirl.

The designing of tilting pads presents many challenges. Common difficulties, whose effects need minimizing, include unloaded pad instability, pad wiping over the pivot, and hot fluid carryover, which are discussed below. Conventional tilting pads exhibit many shortcomings in facing these problems.

For the case of normal steady state rotation of a horizontally-oriented shaft, the pads in a conventional tilting pad bearing assembly situated above a horizontal split of the bearing are unloaded. Here, the unloaded pads tend to oscillate about their pivots. Rocking back and forth causes the leading edge of such a pad to bang the convex surface of the shaft. This phenomenon, commonly known as spragging, can dislodge large sections of babbitt metal from the backing of the conventional tilting pad. Resultant dangers include separation of the babbitt metal along the length of the pad as well as carry of the dislodged babbitt metal into clearance space between the pad and the shaft. This undesirably results in metal contact and excessive heating, which in turn lead to operational failure.

In a conventional tilting pad subject to extremely large loading, forced mechanical engaging occurs between the convex surface of the shaft and the arc of the pad. Of course, this wiping usually occurs on the arc portion trapped directly over the pivot, rather than on the freely tilting ends.

Hot fluid carryover is a classic problem inherent in tilting pad bearings. Many researchers have devised elaborate configurations for diverting fluid flow away from the region between the trailing and leading edges of successive tilting pads. In particular, shearing stress in the fluid because of an upstream pad heats the fluid. This heating of the fluid is a function of the fluid film thickness, which in turn is a function of the separation between the shaft and the pad face. Horsepower loss is inversely proportional to this film thickness.

Thus, a need exists for a tilting pad that minimizes the occurrences of unloaded pad instability and the effects of pad wiping over the pivot as well as hot fluid carryover. A further need exists for a bearing arrangement that increases hydrodynamic support for the convex surface of the shaft and decreases horsepower loss.

SUMMARY OF THE INVENTION

The shortcomings of the prior art are overcome and additional advantages are provided through the provision of a true-tilting pad having a face that includes a border region defining a pocket with longitudinal sidebars, a bottom, and an abrupt step. The true-tilting pad also has leading as well as trailing portions. The leading portion is adapted to be positioned upstream relative to the rotation direction of a shaft. The trailing portion is adapted to be positioned downstream relative to the rotation direction of the shaft. The face extends longitudinally between the leading and trailing portions. The true-tilting of the present invention pad is pivotally supported by a pivot. The border region includes an engagement surface. The shaft is adapted to be rotated by a prime mover and has a convex surface. The true-tilting pad is adapted to cooperate with one or more other pads and fluid within a housing to hydrodynamically and mechanically support the shaft. In addition, the true-tilting pad tilts free of mechanical engagement with the other pads. The pocket, with its longitudinal sidebars, bottom, and abrupt step, hydrodynamically increases fluid film pressure on the convex surface of the shaft during rotation of the shaft.

In another embodiment of the present invention, the leading portion further defines an entrance to the pocket. Preferably, the sidebars converge along the rotation direction. The pocket hydrodynamically generates pressure in the fluid that effects on the face a counteraction force about the pivot and upstream relative to the rotation direction in order to counteract the spragging force. This decreases oscillation tendencies of the true-tilting pad about the pivot.

In another embodiment, a method of bearing a journal dimensions the pocket to hydrodynamically increase pressure on the convex surface of the journal during rotation of the journal.

In yet another aspect of the present invention, first and second true-tilting pads are adapted to cooperate with each other, a number of other pads, and the fluid to hydrodynamically and mechanically support the shaft. The shaft tends during rotation to orbit in a path approximating an ellipse, but the hydrodynamically increasing pressures are further for decreasing one or more of the axes of the ellipse. Also, this decreasing sizes the axes toward having substantially equal length.

In a further aspect of the invention, the first and second true-tilting pads and the number of other pads are positioned to form an overall bearing having a substantially circular shape with a center. The true-tilting pads tilt free of mechanical engagement with each other and with the number of other pads. The hydrodynamically increasing pressures are further for hydrodynamically centering the shaft at the center of the substantially circular shape of the overall bearing, during the rotation.

In yet another embodiment, a method of bearing a journal dimensions the pocket of the first and second true-tilting pads and relatively positions these true-tilting pads and the number of other pads to increase support for the journal.

In a still further embodiment of the present invention, the true-tilting pad is pivotally supported by a hydrostatic pivot, as well as leading and trailing cam pivots that are fixedly connected to the housing. Additionally, the true-tilting pad has a backside and a body. The backside defines a cavity. The body defines a conduit between the pocket and the cavity. The leading and trailing portions are formed for tilt guidance with respect to the convex surface of the shaft by the respective leading and trailing cam pivots. During the rotation, the pocket hydrodynamically increases pressure on the convex surface of the shaft and hydrostatically increases pressure on an inner surface of the housing. In addition, the body can define one or more passageways in fluid communication with the conduit for hydrostatic support of one or more of the leading and trailing portions with respect to the cam pivots.

The present invention advantageously minimizes the occurrences of unloaded pad instability and the effects of pad wiping over the pivot as well as hot fluid carryover. Further, the present invention increases hydrodynamic support for the convex surface of the shaft and decreases horsepower loss.

Additional features and advantages are realized through the structures and techniques of the present invention. Other embodiments and aspects of the invention are described in detail herein.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description of preferred embodiments taken in conjunction with the accompanying drawings in which:

BEST MODE FOR CARRYING OUT THE INVENTION

In accordance with the principles of the present invention, a hydrodynamic and mechanical support capability is provided in which a true-tilting pad of a journal bearing has its face toward a convex surface of a shaft. The true-tilting pad tilts free of mechanical engagement with one or more other pads. The face defines a pocket with longitudinal sidebars, a bottom, and an abrupt step that hydrodynamically increase support for the convex surface, stabilize the true-tilting pad, and decrease horsepower loss, as described below.

Figure 1:
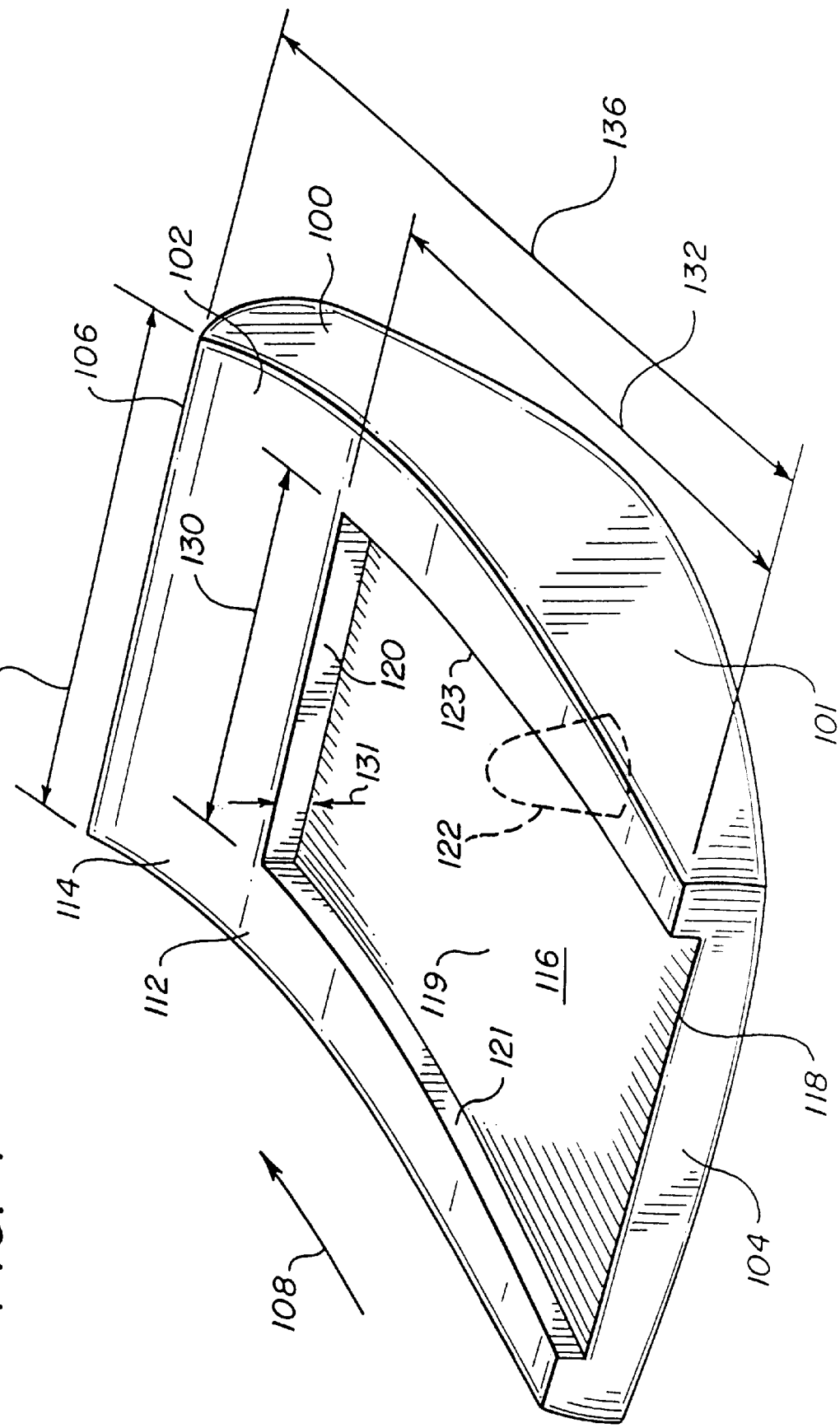
FIG. 1 depicts one example of a true-tilting pad of the present invention.
Figure 2:
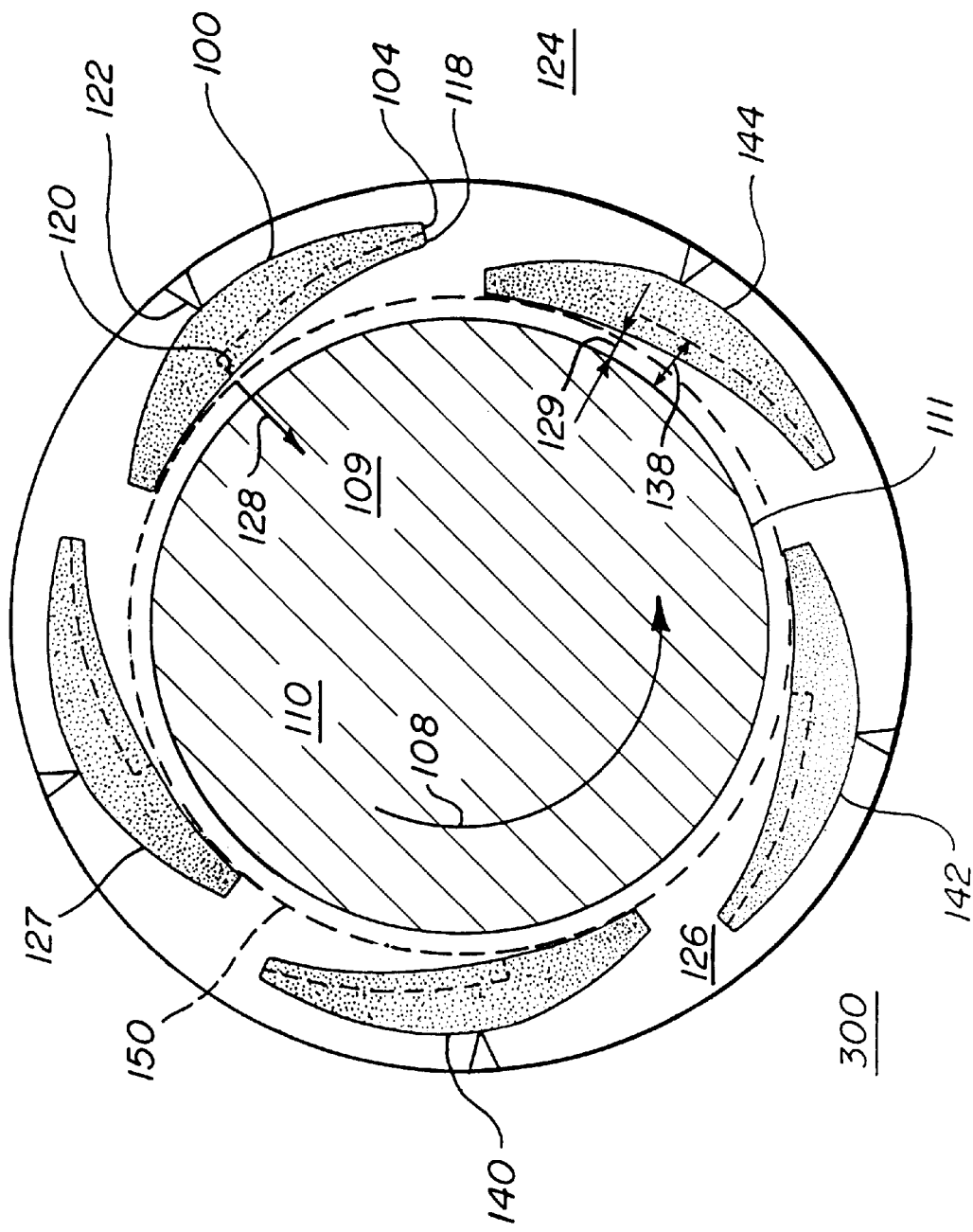
FIG. 2 depicts one example of an overall bearing using the true-tilting pad of FIG. 1, in accordance with the principles of the present invention.

One example of a true-tilting pad incorporating and using the hydrodynamic and mechanical support capability of the present invention is depicted in FIGS. 1 and 2, and described in detail below.

In this example, true-tilting pad 100 includes a body 101, a face 102, and leading portion 104 as well as trailing portion 106. The true-tilting pad exhibits little or no cross-coupling, as discussed below. As shown in FIG. 2, the leading portion is positioned upstream relative to rotation direction 108 of journal or shaft 110. Also, the trailing portion is positioned downstream relative to the rotation direction of the shaft. The face 102 extends longitudinally between the leading and trailing portions. The shaft is rotatable by prime mover 109 and includes convex surface 111.

As depicted in FIG. 1, face 102 has border region 112 with engagement surface 114. In the exemplary embodiment depicted, the border region is coextensive with the engagement surface. Also, the border region defines pocket 116 having longitudinal sidebars 121, 123, bottom 119, and abrupt step 120. The angle of the abrupt step with respect to the face 102 is in the range 89 to 115 degrees, and is most preferably in the range 89 to 91 degrees. In one preferred embodiment, the sidebars converge along the rotation direction 108. This convergence reduces bulk proximity between the convex surface 111 and the face at entrance 118, and therefore reduces horsepower loss.

As shown in FIG. 2, true-tilting pad 100 is pivotally supported by pivot 122. Housing 124 supports the pivot and holds lubricating fluid 126, which can be gaseous or liquid. The true-tilting pad cooperates with one or more other pads 127, which additional pads could be formed in accordance with the present invention or conventionally. The true-tilting pad tilts free of engagement with the other pads. Moreover, the true-tilting pad 100 and the other pads cooperate with each other and the fluid to hydrodynamically and mechanically increase support for shaft 110. In one particular aspect of the present invention, the pocket 116 of true-tilting pad 100 hydrodynamically increases pressure on convex surface 111 during rotation of the shaft.

In the embodiment of the present invention depicted in FIG. 1, leading portion 104 defines entrance 118 of pocket 116. Furthermore, border region 112 defines the pocket laterally interiorly with respect to face 102.

Abrupt step 120 hydrodynamically constricts flow of fluid 126 during the rotation of shaft 110. Entrance 118 and sidebars 121, 123 feed the fluid for flow through pocket 116 and over the abrupt step 120. That is, the abrupt step constitutes an abrupt change that forces the streamlines of the fluid to dramatically converge. This abrupt restriction builds up a large pressure on the face 102 upstream, relative to the rotation of the shaft, of the abrupt step 120. The abrupt step hydrodynamically enhances the wedge effect. Therefore, the fluid 126 flows relatively faster between the abrupt step 120 and the convex surface 111 than immediately upstream. This yields relatively increased pressure immediately upstream of the abrupt step 120. Accordingly, the pocket 116 hydrodynamically generates additional lift on the convex surface 111. In one embodiment, this hydrodynamic lift is directed substantially along relative lift direction 128, as depicted in FIG. 2.

Rotation of shaft 110 in the presence of fluid 126 naturally develops a spragging force about pivot 122. In particular, the rotation causes engagement between the fluid and face 102. This spragging force is directed downstream relative to rotation direction 108 of the shaft. Advantageously, pocket 116 generates pressure in the fluid that effects on face 102 a counteraction force about the pivot and upstream relative to the rotation direction. This counteraction force of the present invention desirably counteracts the spragging force. So, the pocket 116 hydrodynamically produces a load that stabilizes true-tilting pad 100. In producing the counteraction force, the present invention advantageously discourages development of a couple moment about the pivot. Accordingly, the present invention decreases oscillation tendencies of the true-tilting pad about the pivot. This prevents spragging as well as babbitt metal failure.

Engagement surface 114, in one embodiment, is shaped concavely for substantially radial alignment with the convex surface of the shaft. Furthermore, in a preferred embodiment, pocket 116 longitudinally extends over pivot 122 and thereby increases radial clearance of the convex surface. So, the engagement surface 114 does not extend over pocket 116. Therefore, the decreased surface area of the engagement surface 114 exposed for mechanical engaging with the convex surface 111, of the shaft 110, advantageously translates into decreased friction during mechanical engaging with the shaft. Namely, the convex surface only wipes the engagement surface 114.

By reducing bulk proximity, one also decreases shearing stress and temperature rise in fluid 126 located between the convex surface and face 102. Moreover, as discussed further below, one could vary performance characteristics of true-tilting pad 100 to halve the shearing stress and thereby halve the horsepower loss.

With a typical input temperature of fluid 126 at about 120 degrees fahrenheit, the conventional tilting pad usually yields an output fluid temperature of about 170 degrees fahrenheit. As outlined below, one could vary the performance characteristics to yield instead an output fluid temperature of about 145 degrees fahrenheit, following the same 120 degrees fahrenheit input fluid temperature. Alternatively, the true-tilting pad could begin rather with an input fluid temperature of about 145 degrees to yield the same 170 degrees fahrenheit output fluid temperature. This desirably allows use of a less viscous lubricant as the fluid and accordingly reduces horsepower loss. Therefore, the true-tilting pad advantageously addresses the root cause of hot fluid carryover by decreasing the increase in temperature of the fluid carried over.

By reducing thermal gradients throughout the fluid, the true-tilting pad 100 with abruptly-stepped pocket 116 lessens stresses in the pad itself. Many additional benefits also result from the decrease in fluid temperature increase. For example, in known constructions of tilting pads, the present invention advantageously lessens stresses at the interface bond of the steel backing with the babbitt metal. Also, the present inventions minimizes silver removal, so different known mixtures of oil and additives can be used with various combinations of metals and alloys.

Detailed three-dimensional finite element analysis shows true-tilting pad 100 can support the same load on shaft 110 as the conventional tilting pad, while consuming only forty-five percent as much horsepower. The performance characteristics resulting from abrupt step 120 depend on parameters such as abrupt step clearance 129, abrupt step height 131, abrupt step width 130, abrupt step arc length 132, pad width 134, pad arc length 136, and pivot clearance 138, as shown in FIGS. 1 and 2. In particular, the abrupt step clearance is the local fluid thickness as measured from the convex surface 111 to the face 102. Furthermore, the pivot clearance is measured from the convex surface to bottom 119 of the pocket 116. Desirably, one can develop a wide range of performance characteristics for the true-tilting pad by varying and tuning these parameters.

In accordance with one preferred embodiment of the present invention, true-tilting pad 100 has the following characteristics. The ratio of abrupt step clearance 129 to pivot clearance 138 is in the range 1.25 to 10.00, and is most preferably in the range 1.80 to 2.20. Also, the ratio of abrupt step arc length 132 to pad arc length 136 is in the range 0.40 to 0.85, and is most preferably in the range 0.42 to 0.75. Additionally, the ratio of abrupt step width 130 to pad width 134 is in the range 0.10 to 0.95, and is most preferably in the range 0.30 to 0.90. Moreover, pivot 122 is preferably positioned longitudinally from leading edge 104 approximately sixty percent along the pad arc length 136. Further, the pivot is positioned transversely symmetrically with respect to the pad width. These optimizations enhance the converging wedge in fluid 126 between face 102 and convex surface 111. This, in turn, reduces the horsepower loss.

FIG. 2 shows an exemplary embodiment of overall journal bearing 300 formed through selective positioning of five pads 100, 127, 140, 142, 144. In one preferred embodiment, the pads are true-tilting pads configured in accordance with the present invention. The pads cooperate with each other and fluid 126 to hydrodynamically increase pressures on convex surface 111. One can tune the parameters of the pads to use these pressures for hydrodynamically squeezing the convex surface during the rotation. Further, the pads hydrodynamically generate increased lift on the convex surface. Preferably, the overall bearing has a substantially circular shape with a center. These pressures advantageously can hydrodynamically center shaft 110 at the center of the substantially circular shape of the overall bearing, during the rotation.

Moreover, the present invention also addresses the problem of shaft 110 tending to orbit elliptically during the rotation. In particular, the hydrodynamic pressures contributed by pads 100, 127, 140, 142, 144 can reduce, and size similarly, the major and minor axes of the ellipse. This shifts the tendency of the shaft toward rotating in a more-centered and less-elliptical orbit.

In the case of shaft 110 having horizontal axis orientation, one could select pads 100, 127, 140, 142, 144 to be true-tilting pads and tune them as follows. In order to reduce horsepower loss, one could select arc length 136 of upper tilting pads 100, 127 to be half that of bottom tilting pad 142. Furthermore, one could reduce the pad width 134 of the upper tilting pads relative to that of the bottom tilting pad. Additionally, one could slightly reduce the arc length of side tilting pads 140, 144, relative to the arc length of the bottom tilting pad. As described above, hydrodynamic loading stabilizes the upper pads against spragging. Also, the side pads 140, 144 hydrodynamically squeeze the shaft to a more symmetrical and circular orbit. Further, the large hydrodynamic lift decreases load on the bottom pad. Decreased eccentricity and decreased horsepower loss result. Mathematically, the off-diagonal terms are zero, or nearly zero, in the stiffness and damping matrices, as represented below, for overall bearing 300.

Spring Coefficients: (lb/in)

$$\begin{bmatrix} K_{xx} & K_{xy} \\ K_{yx} & K_{yy} \end{bmatrix} = \begin{bmatrix} 1.0 \times 10^6 & 0 \\ 0 & 4.0 \times 10^6 \end{bmatrix}$$

Damping Coefficients: (lb-sec/in)

$$\begin{bmatrix} D_{xx} & D_{xy} \\ D_{yx} & D_{yy} \end{bmatrix} = \begin{bmatrix} 2,350 & 0 \\ 0 & 2,680 \end{bmatrix}$$

Therefore, there is little or no cross-coupling.

So, true-tilting pad 100, truly tilting because it exhibits little or no cross-coupling, suits use in all high performance turbo-equipment. Conversely, using the conventional interleaved tilting pads arrangement, and thereby introducing leading and trailing forces that make the off-diagonal terms large, compromises performance and results in instability.

Figure 3:
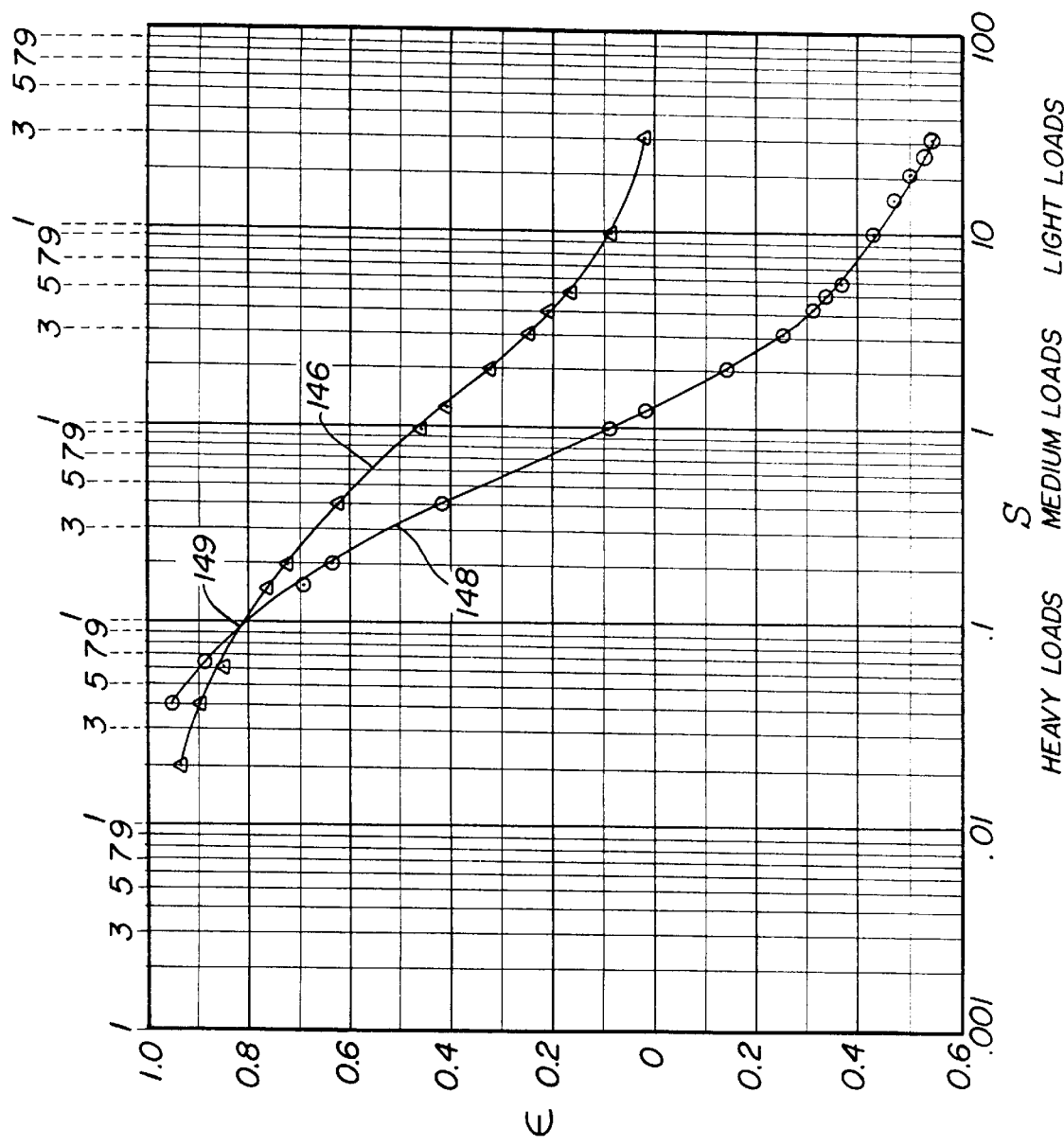
FIG. 3 plots a curve of eccentricity versus Sommerfeld number (which increases with decreasing load) for the true-tilting pad of FIG. 1, and such a curve for a conventional tilting pad.

For a given less than very-heavy load, a given speed, and a given geometry, entrance 118, sidebars 121, 123, bottom 119, and abrupt step 120 of pocket 116 produce a hydrodynamic force far in excess of the conventional tilting pad. In FIG. 3, a Sommerfeld number less than 0.1 represents a very-heavy load. Moreover, eccentricity increases along the vertical axis; but, load decreases along the horizontal axis and so increasing Sommerfeld numbers represent a decreasing load.

FIG. 3 depicts plots of eccentricity versus load for a conventional tilting pad, curve 146, and the true-tilting pad of the present invention, curve 148. For purposes of illustration, curve 148 corresponds to a true-tilting pad 100 formed with exemplary parameter values, which by no means represent the absolute limit of performance for other embodiments of the present invention formed having other parameter values.

As illustrated in FIG. 3, true-tilting pad 100 of the present invention produces a much larger restoring force, and accordingly could support more load up to heavy loads, than the conventional tilting pad. Also, for a given less than very-heavy load, the true-tilting pad of the present invention yields much less eccentricity than the conventional tilting pad. Moreover, on this plot, all solutions for the conventional tilting pad lie along curve 146. Conversely, below intersection 149 of curves 146, 148, curve 148 only represents a limit of performance for this particular embodiment of the present invention formed with exemplary parameter values. Further, the intersection 149 represents a limitation of performance of this embodiment of true-tilting pad 100 only when bearing very-heavy loads.

That is, true-tilting pad 100 provides increased tunability for overall bearing 300. Tuning of parameters 129, 130, 132, 134, 136, 138 for influencing the fluid wedge, as well as of the positioning of pads 100, 127, 140, 142, 144, allows one to employ superior lift to suit many possible needs, uses, and environments. In accordance with the present invention, one can tune the parameters and positioning to suit any desired characteristics bounded by curves 146, 148 below their intersection 149. Namely, any solution below this intersection and between the bounds of the conventional pad and the limit for this exemplary embodiment of the true-tilting pad of the present invention represents a valid solution, in accordance with the present invention. Therefore, the true-tilting pad presents many more design parameters, heretofore unavailable, for working to meet specifications in multiple applications of the present invention.

Numerous embodiments in accordance with the present invention work well for either horizontal or vertical axis orientation of shaft 110. Still, in accordance with the present invention, one can optimally tune the parameters and positioning to suit any particular axis orientation of the shaft. For instance, in a case of horizontal orientation of the axis of the shaft, curve 148 shows negative eccentricity for some light loads, meaning one could tune the parameters and positioning to hydrodynamically force the center of the shaft vertically above the center of overall bearing 300. In particular, FIG. 3 represents a light load by a Sommerfeld number greater than one.

As discussed above, the enhanced hydrodynamic force results from additional hydrodynamic pressure on convex surface 111 provided by pocket 116 on face 102 of true-tilting pad 100. The squeezing aspect of this enhanced hydrodynamic force can be represented mathematically by an increase in magnitude of a transverse component of the force vector corresponding to the lift. In the case of vertical orientation of the shaft, one can give equivalent treatment to the components of the force vector.

But, in the case of horizontal orientation of the shaft, one must treat the components of the force vector dissimilarly. Namely, one typically aligns one component vertically, to be collinear with the influence of gravity. In one embodiment, one can direct the enhancement capability of the present invention toward greatly increasing the remaining, horizontal component. Hydrodynamically, this tremendous increase in the horizontal component contributes a large vertical lift, to combat the deleterious effects on shaft 110 of the pull of gravity downward from the center of overall bearing 300. Nevertheless, the hydrodynamic lift enhancement also directly increases the vertical component of the force vector.

True-tilting pad 100 of the present invention advantageously works toward centering shaft 110 in clearance space 150 of overall bearing 300, as depicted in FIG. 2. Therefore, pocket 116 serves to increase the efficiency of machinery. For example, in a turbine embodiment of the invention, centering the shaft in the overall bearing advantageously would center the impeller in its annulus. During rotation of the shaft, pocket 116 desirably minimizes the eccentricity of the shaft position and the ellipticity of its orbit, in accordance with the present invention.

Figure 4:
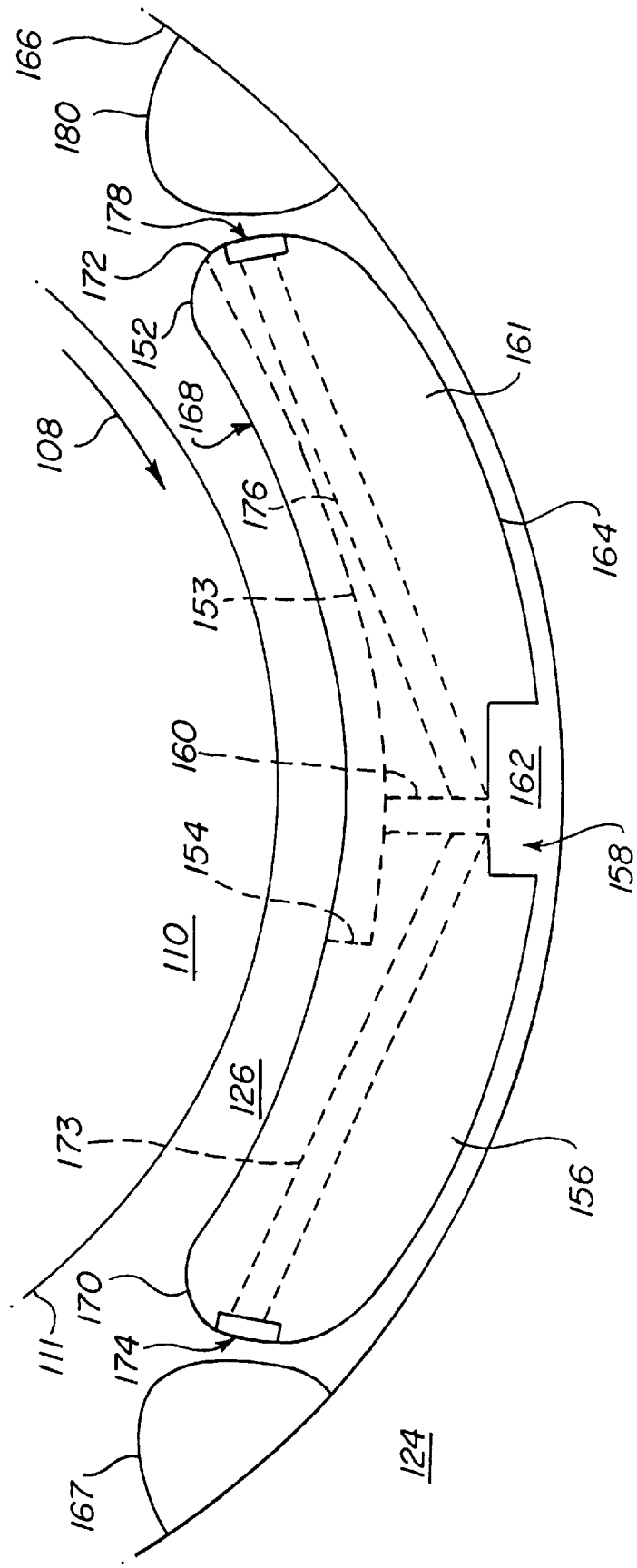
FIG. 4 depicts one embodiment of the true-tilting pad of FIG. 1 suitable for use with a hydrostatic pivot, in accordance with the principles of the present invention.

In another embodiment in accordance with the present invention, entrance 152, bottom 153, and abrupt step 154 of pocket 168 of true-tilting pad 156 improve performance of a hydrostatic pivot 158, as illustrated in FIG. 4. The hydrostatic pivot includes feedhole 160, in the pocket 168 of the face and body 161 of the pad, for feeding fluid 126 down to cavity 162 on backside 164 of the true-tilting pad. This works to float the true-tilting pad over inner surface 166 of housing 124. In one embodiment, the hydrostatic pivot can operate with trailing and leading cam pivots 167, 180 stationary on the housing, for engagement with cooperatively formed trailing and leading ends 170, 172, respectively, of the pad. The trailing and leading cam pivots 167, 180 accordingly guide proper tilt of the true-tilting pad with respect to convex surface 111 of shaft 110. Hydrostatic support in the present invention with respect to trailing and leading cam pivots 167, 180 is discussed further below.

The higher pressures, thoroughly discussed above, produced by pocket 168 can also increase pressure on fluid 126 about feedhole 160 of the hydrostatic pivot, thereby improving the floating performance of hydrostatic pivot 158 as well. In particular, a conduit formed from the pocket 168, the feedhole 160, and the cavity 162 permits communication of the fluid. So, one can tune parameters 129, 130, 132, 134, 136, 138 to further produce high pressure on the fluid in the conduit. This advantageously increases the hydrostatic pressure on the true-tilting pad 156 in a direction away from inner surface 166 of housing 124.

In the particular embodiment depicted in FIG. 4, body 161 and trailing portion 170 define passageway 173 and cavity 174 for hydrostatic support of the trailing portion 170 in a direction away from the trailing cam pivot 167. In accordance with the present invention, the passageway 173 and the cavity 174 are in fluid communication with the feedhole 160. Therefore, the increased hydrostatic pressure in the feedhole 160, according to the present invention, advantageously increases hydrostatic pressure on the trailing portion 170 with respect to trailing cam pivot 167. In addition, body 161 and leading portion 172 can define passageway 176 and cavity 178, in fluid communication with the feedhole 160, for hydrostatic support of the leading portion 172 with respect to leading cam pivot 180. Furthermore, one can tune parameters 129, 130, 132, 134, 136, 138 to produce desired pressures on the fluid in these passageways 173, 176 and respective cavities 174, 178 for hydrostatic support of the trailing and leading portions 170, 172.

Figure 5:
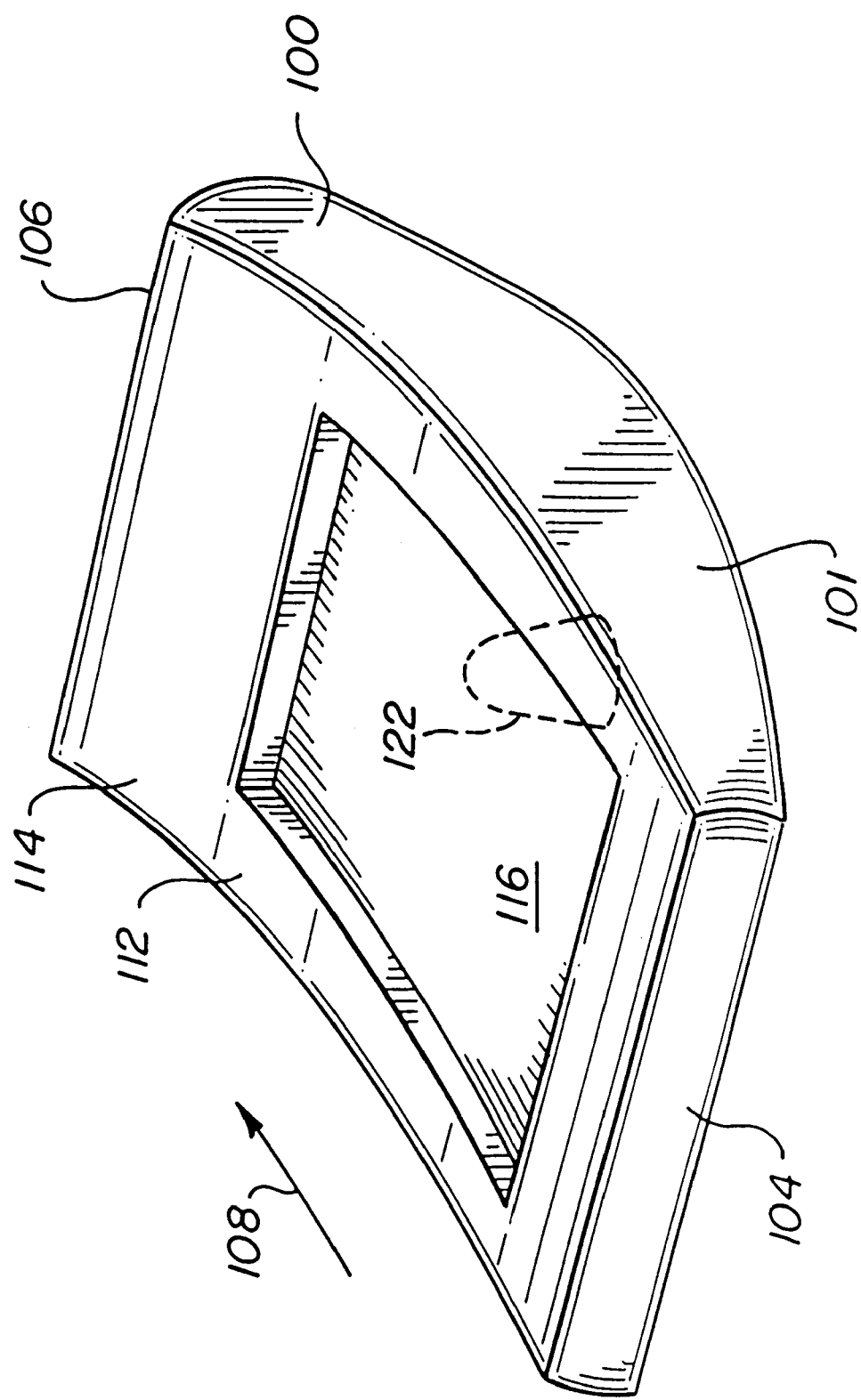
FIG. 5 depicts one embodiment of the true-tilting pad of FIG. 1 where the leading portion does not define an entrance to the pocket, in accordance with the principles of the present invention.

In the embodiment of the present invention depicted in FIG. 5, leading portion 104 does not define an entrance to pocket 116.

Numerous alternative variations exist for practicing the present invention. One could easily vary the number and arrangement of pads. For instance, one could easily form overall bearing 300 using instead a conventional pad along with two true-tilting pads configured in accordance with the present invention. Of course, border region 112 need not be coextensive with engagement surface 114. Further, engagement surface 114 could be rippled, dimpled, or diamonded and need not otherwise be continuous. Longitudinal sidebars 121, 123 can easily be aligned in parallel or have various oblique alignments. Naturally, entrance 118 to pocket 116 could be defined forward of leading region 104, such as by gradations on face 102. In the event hydrostatic pivot 158 uses a feedhole bypassing pocket 168, one can further define the pocket to include a passageway to the feedhole. Then, the passageway and the feedhole together form the conduit between the pocket and cavity 162.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of bearing a journal, said method comprising;
    positioning a leading portion of a true-tilting pad upstream relative to a rotation direction of the journal and free of mechanical engagement with one or more other pads of a bearing for the journal;
    positioning a trailing portion of the true-tilting pad downstream relative to the rotation direction of the journal and free of mechanical engagement with the other pads;
    dimensioning a pocket, in forming the pocket on a face of the true-tilting pad extending between the leading and trailing portions, to hydrodynamically increase pressure on a convex surface of the journal during rotation of the journal; and
    directing said face toward the journal.

2. The method of claim 1, further comprising dimensioning the pocket to hydrodynamically and mechanically decrease an amount of horsepower expended to rotate the journal during the rotation of the journal.

3. The method of claim 1, further comprising dimensioning the pocket to hydrodynamically generate pressure that effects on the face a counteraction force about a pivot of the true-tilting pad and upstream relative to the rotation direction in order to counteract a spragging force.

4. The method of claim 1, further comprising dimensioning the pocket to hydrodynamically generate a load on the face that decreases oscillation tendencies of the true-tilting pad.

5. A method of bearing a journal, said method comprising:

providing first and second true-tilting pads and a number of other pads to bear the journal;

positioning a leading portion of the first true-tilting pad upstream relative to a rotation direction of the journal;

positioning a trailing portion of the first true-tilting pad downstream relative to the rotation direction of the journal;

positioning a leading portion of the second true-tilting pad upstream relative to the rotation direction of the journal;

positioning a trailing portion of the second true-tilting pad downstream relative to the rotation direction of the journal;

positioning the leading and trailing portions of the first true-tilting pad free of mechanical engagement with the second true-tilting pad and with the number of other pads;

positioning the leading and trailing portions of the second true-tilting pad free of mechanical engagement with the first true-tilting pad and with the number of other pads;

dimensioning a pocket in forming the pocket on a face of the first true-tilting pad extending between the leading and trailing portions of the first true-tilting pad, dimensioning a pocket in forming the pocket on a face of the second true-tilting pad extending between the leading and trailing portions of the second true-tilting pad, relatively positioning the first and second true-tilting pads and the number of other pads, and directing said faces toward the journal to increase support for the journal.

6. The method of claim 5, wherein said dimensioning of pockets of said first and second true-tilting pads and said relatively positioning said first and second true-tilting pads and said number of other pads hydrodynamically generates increased lift on the convex surface of the journal during the rotation of the journal.

7. The method of claim 5, wherein said dimensioning of pockets of said first and second true-tilting pads and said relatively positioning said first and second true-tilting pads and said number of other pads hydrodynamically provide a decreased-ellipticity path of orbiting of the journal during the rotation of the journal.

8. The method of claim 5, wherein relative positions of the first and second true-tilting pads and the number of other pads form an overall bearing having a substantially circular shape with a center; and wherein said dimensioning of pockets of said first and second true-tilting pads and said relatively positioning said first and second true-tilting pads and said number of other pads hydrodynamically promote centering of the journal toward the center of the substantially circular shape of the overall bearing, during the rotation of the journal.

9. The method of claim 5, wherein said dimensioning of pockets of said first and second true-tilting pads and said relatively positioning said first and second true-tilting pads and said number of other pads hydrodynamically provide an increased-symmetry path of orbiting of the journal during the rotation of the journal.

10. The method of claim 5, wherein said dimensioning of pockets of said first and second true-tilting pads and said relatively positioning said first and second true-tilting pads and said number of other pads hydrodynamically promote symmetry of orbiting of the journal during the rotation of the journal.

* * * * *

UNITED STATES PATENT AND TRADEMARK OFFICE
CERTIFICATE OF CORRECTION

PATENT NO. : 6,079,102
DATED : June 27, 2000
INVENTOR(S) : William Miller

It is certified that error appears in the above-identified patent and that said Letters Patent are hereby corrected as shown below:

ON THE TITLE PAGE:

ITEM [73] Assignee: Delete "Holdings" and replace with --Holding--.

ITEM [62] Related U.S. Application Data: Delete "May 31, 1997" and replace with --March 31, 1997--.

Signed and Sealed this

Third Day of April, 2001

Attest:

NICHOLAS P. GODICI

Attesting Officer     Acting Director of the United States Patent and Trademark Office